United States Patent
Lubicki et al.

(10) Patent No.: US 8,971,002 B1
(45) Date of Patent: Mar. 3, 2015

(54) SYSTEM AND METHOD OF PROVIDING ISOLATED POWER TO GATE DRIVING CIRCUITS IN SOLID STATE FAULT CURRENT LIMITERS

(71) Applicant: Varian Semiconductor Equipment Associates, Inc., Gloucester, MA (US)

(72) Inventors: Piotr R. Lubicki, Peabody, MA (US); Kasegn Tekletsadik, Middleton, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 9 days.

(21) Appl. No.: 13/973,475

(22) Filed: Aug. 22, 2013

(51) Int. Cl.
- *H02H 7/00* (2006.01)
- *H02H 9/02* (2006.01)
- *H02H 9/04* (2006.01)

(52) U.S. Cl.
CPC *H02H 9/025* (2013.01); *H02H 9/04* (2013.01)
USPC .......................................... 361/93.9; 391/19

(58) Field of Classification Search
CPC ........... H02H 9/023; H02H 9/02; H02H 9/08; H02H 3/08; H01H 2009/543
USPC ........................................ 361/8, 19, 93.9, 62
See application file for complete search history.

(56) References Cited

U.S. PATENT DOCUMENTS

| | | | | |
|---|---|---|---|---|
| 3,611,043 | A * | 10/1971 | Steen | 361/102 |
| 5,170,310 | A * | 12/1992 | Studtmann et al. | 361/94 |
| 2006/0071639 | A1* | 4/2006 | Ross et al. | 320/116 |
| 2007/0121257 | A1 | 5/2007 | Maitra et al. | |
| 2011/0309809 | A1 | 12/2011 | Rao et al. | |
| 2012/0299393 | A1* | 11/2012 | Hafner et al. | 307/113 |
| 2012/0327538 | A1 | 12/2012 | Lin et al. | |
| 2013/0188399 | A1 | 7/2013 | Tang et al. | |

FOREIGN PATENT DOCUMENTS

JP 2001-145257 A 5/2001

OTHER PUBLICATIONS

International Search Report and Written Opinion Mailed Dec. 3, 2014 for PCT/US2014/050687 Filed Aug. 12, 2014.

* cited by examiner

*Primary Examiner* — Danny Nguyen

(57) ABSTRACT

A system and method for providing isolated power to the gate driving circuits used in solid state switching devices is disclosed. Rather than using expensive isolated AC/DC power supplies, an isolation transformer is used to provide isolated AC voltage. In one embodiment, the primary winding of the isolation transformer is disposed across an independent AC source. In another embodiment, the primary winding of the isolation transformer is disposed across two phases of the AC power line. Isolated AC voltage is then generated across the secondary winding of the isolation transformer. This isolated AC voltage is then used by a non-isolated DC power supply, which generates the power for the gate driving circuit.

10 Claims, 4 Drawing Sheets

SYSTEM AND METHOD OF PROVIDING ISOLATED POWER TO GATE DRIVING CIRCUITS IN SOLID STATE FAULT CURRENT LIMITERS

Embodiments of the present invention relate to methods and apparatus for providing isolated power to gate driving circuits of semiconductor switches in solid state fault current limiters, particularly when the semiconductor switches are disposed in series.

BACKGROUND

Power line faults can be detected and remedied through the use of solid state fault current limiters (SSFCL). These SSFCL devices utilize solid state switching devices, such as IGBT, SCR, IGCT or MOSFET transistors, to block or significantly increase the impedance of the current path between the power source and the load. However, these power lines typically carry voltages ranging from 10 kV to over 230 kV. Since the typical switching device is only rated to roughly 6 kV, often it is necessary to place a plurality of these SSFCL devices in series. The total voltage of the power line, also referred to as the power line voltage, is divided across the total number of SSFCL devices in series, thereby allowing each to operate within its rated range. When a fault is detected, such as a surge in current through the power line, each of the SSFCL devices disables its respective solid state switching device, thereby increasing the resistance seen by the power source and lowering the current.

FIG. 1 shows a SSFCL device 100 commonly used. The SSFCL device 100 comprises a solid state switching device 110, which may be any of the transistors described above. These solid state switching devices 110 typically have at least three terminals, a source or input side 111, a drain or output side 112, and a gate 113. The assertion of the gate 113 allows the passage of current from the source 111 to the drain 112, while the deassertion of the gate 113 disables the passage of current through the solid state switching device 110.

This solid state switching device 110 may be in parallel with one or more of the following components: a snubber 120, a reactor 130 and a transient suppressor 140. The snubber 120 is typically a resistor in series with a capacitor used to dissipate the energy of the transient and to reduce the overvoltage by filtering the transient frequency (i.e. slowing the "ringing" frequency). The transient suppressor 140 is used to clamp the overvoltage transient below the level of the ratings of the snubber 120 and solid state switching device 110. The snubber 120, the reactor 130 and the transient suppressor 140 may be referred to as parallel components 145, since these components 145, in some embodiments, provide a parallel path for current for travel when the solid state switching devices 110 are in the disabled or off state. These parallel components 145 are used to provide an alternative high impedance current path from the power source to the load when the solid state switching device 110 is in the off state and protect the solid state switching device 110 from transient overvoltage during turn on and turn off.

The gate 113 of solid state switching device 110 is in communication with a gate driving circuit 150. This gate driving circuit 150 monitors the current being supplied by the power line 101 using a current sensor 160. The gate driving circuit 150 is used to enable or block the passage of current through the solid state switching device 110, based on information from the current sensor 160.

The gate driving circuit 150 may be referenced to the voltage seen by the solid state device 110. In other words, its output voltage is related to the voltages presented on the source 111 or drain 112 of the solid state switching device 110. Traditionally, this is achieved by using an isolated power supply 170. This DC power supply 170 may be a relatively low voltage, low current power supply. For example, the gate driving circuit 150 typically utilizes low voltage, such as up to 48V, and dissipates only a few watts.

However, the isolated power supply 170 of each SSFCL 100 must be electrically isolated from every other isolated power supply 170. In some embodiments, the magnitude of the isolation voltage must be at least the total line voltage divided by the number of SSFCL devices 110. In other embodiments, the magnitude of the isolation voltage must be at least the total line voltage.

This isolation is typically performed using an isolated DC power source 170. These isolated DC power sources 170 may be optically isolated, or isolated using another means. In these embodiments, despite the low voltage and current requirements, the isolated DC power supply 170 may be unreliable and very expensive, potentially costing thousands of dollars each. These isolated power supplies 170 have to deliver stable power over the isolation rated at high voltage. The higher the isolation voltage, the more difficult this task becomes, as the size of the supplies will grow, the cost will grow, the reliability will decrease due to higher probability of high voltage breakdown causing insulation puncture. The lower reliability may also be due to the fact that the output voltage regulation will be difficult to control from the high voltage side (it would have to be controlled on the ground side) and it may be difficult to maintain the voltage needed by the gate of the switch to turn it on and off. Thus, the need to use this specialized isolated power supply 170 greatly increases the total cost of a state solid fault current limiter system.

Therefore, it would be beneficial if there were a system and method for providing isolated power to the gate driving circuits that was less expensive and more reliable than current solutions.

SUMMARY

A system and method for providing isolated power to the gate driving circuits used in solid state switching devices is disclosed. Rather than using expensive isolated AC/DC power supplies, an isolation transformer is used to provide isolated AC voltage. In one embodiment, the primary winding of the isolation transformer is disposed across an independent AC source. In another embodiment, the primary winding of the isolation transformer is disposed across two phases of the AC power line. Isolated AC voltage is then generated across the secondary winding of the isolation transformer. This isolated AC voltage is then used by a non-isolated DC power supply, which generates the power for the gate driving circuit.

According to one embodiment, a solid state fault current limiting device for use with an AC power line is disclosed. This fault current limiting device comprises a solid state switching device, disposed in series in the AC power line, the solid state switching device having an input, an output and a gate, where a voltage applied to the gate determines whether current flows between the input and the output; a gate driving circuit in communication with the gate, to apply a gate voltage to the gate, the voltage referenced to either a voltage at the input or at the output; a current monitor in communication with the AC power line and the gate driving circuit, wherein the gate voltage is determined based on an output from the current monitor; an isolation transformer, having a primary winding and a secondary winding; and a non-isolated AC-to-DC power supply, powered by the secondary winding and referenced to the voltage at the input or at the output, to supply DC power to the gate driving circuit.

According to a second embodiment, a method of limiting fault current in an AC power line is disclosed. This method comprises monitoring current through the AC power line; and applying a voltage to a gate of a solid state switching device to allow or inhibit the flow of current through the solid state switching device, wherein the voltage applied to the gate is generated by using an isolation transformer to create an isolated AC voltage; using a non-isolated AC-to-DC power supply referenced to the AC power line to convert the isolated AC voltage to an isolated DC voltage; and using the isolated DC voltage to power a gate driving circuit in communication with the gate of the solid state switching device.

According to a third embodiment, a system for limiting fault current in an AC power line is disclosed. This system comprises an isolation transformer, having a primary winding and a first secondary winding and a second secondary winding; an independent AC source, wherein the primary winding is disposed across the independent AC source; a first solid state fault current limiting device, comprising a first solid state switching device, disposed in series in the AC power line, the first solid state switching device having a first input, a first output and a first gate, where a first gate voltage applied to the first gate determines whether current flows between the first input and the first output; a first gate driving circuit in communication with the first gate, to apply the first gate voltage to the first gate, the first gate voltage referenced to either a voltage at the first input or at the first output; a first current monitor in communication with the AC power line and the first gate driving circuit, wherein the first gate voltage is determined based on an output from the first current monitor; and a first non-isolated AC-to-DC power supply, powered by the first secondary winding and referenced to the voltage at the first input or at the first output, to supply DC power to the first gate driving circuit; and a second solid state fault current limiting device, comprising a second solid state switching device, disposed in series in the AC power line, the second solid state switching device having a second input in communication with the first output, a second output and a second gate, where a second gate voltage applied to the second gate determines whether current flows between the second input and the second output; a second gate driving circuit in communication with the second gate, to apply the second gate voltage to the second gate, the second gate voltage referenced to either a voltage at the second input or at the second output; a second current monitor in communication with the AC power line and the second gate driving circuit, wherein the second gate voltage is determined based on an output from the second current monitor; and a second non-isolated AC-to-DC power supply, powered by the second secondary winding and referenced to the voltage at the second input or at the second output, to supply DC power to the second gate driving circuit.

BRIEF DESCRIPTION OF THE FIGURES

For a better understanding of the present disclosure, reference is made to the accompanying drawings, which are incorporated herein by reference and in which.

DETAILED DESCRIPTION

As described above, SSFCL devices can be arranged in series in order to allow each solid state switching device to operate within its rated range. However, the power supplies used to power the gate driving circuits must be adequately isolated from one another.

Figure 1:
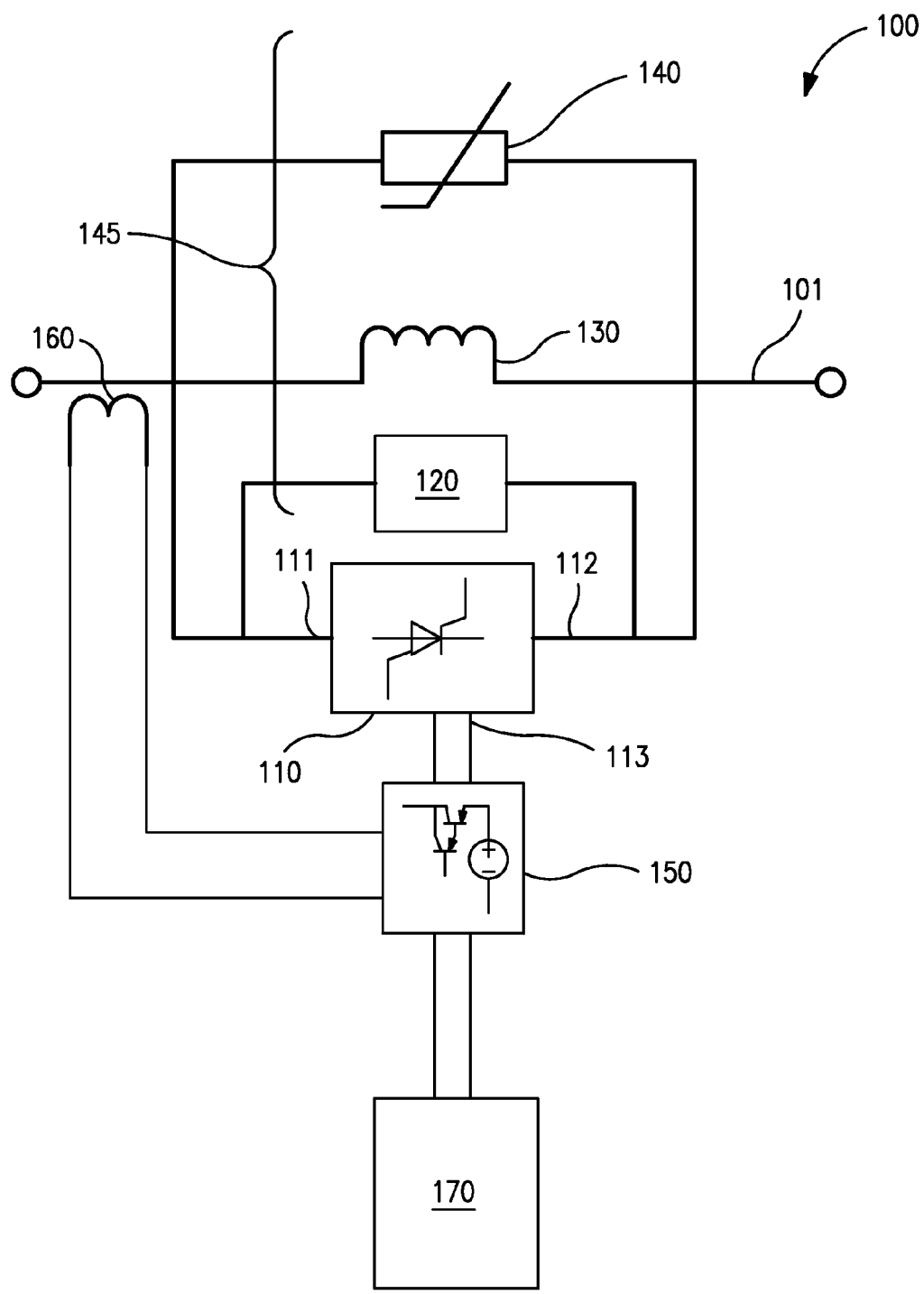
FIG. 1 is a schematic of a SSFCL device in accordance with the prior art.
Figure 2:
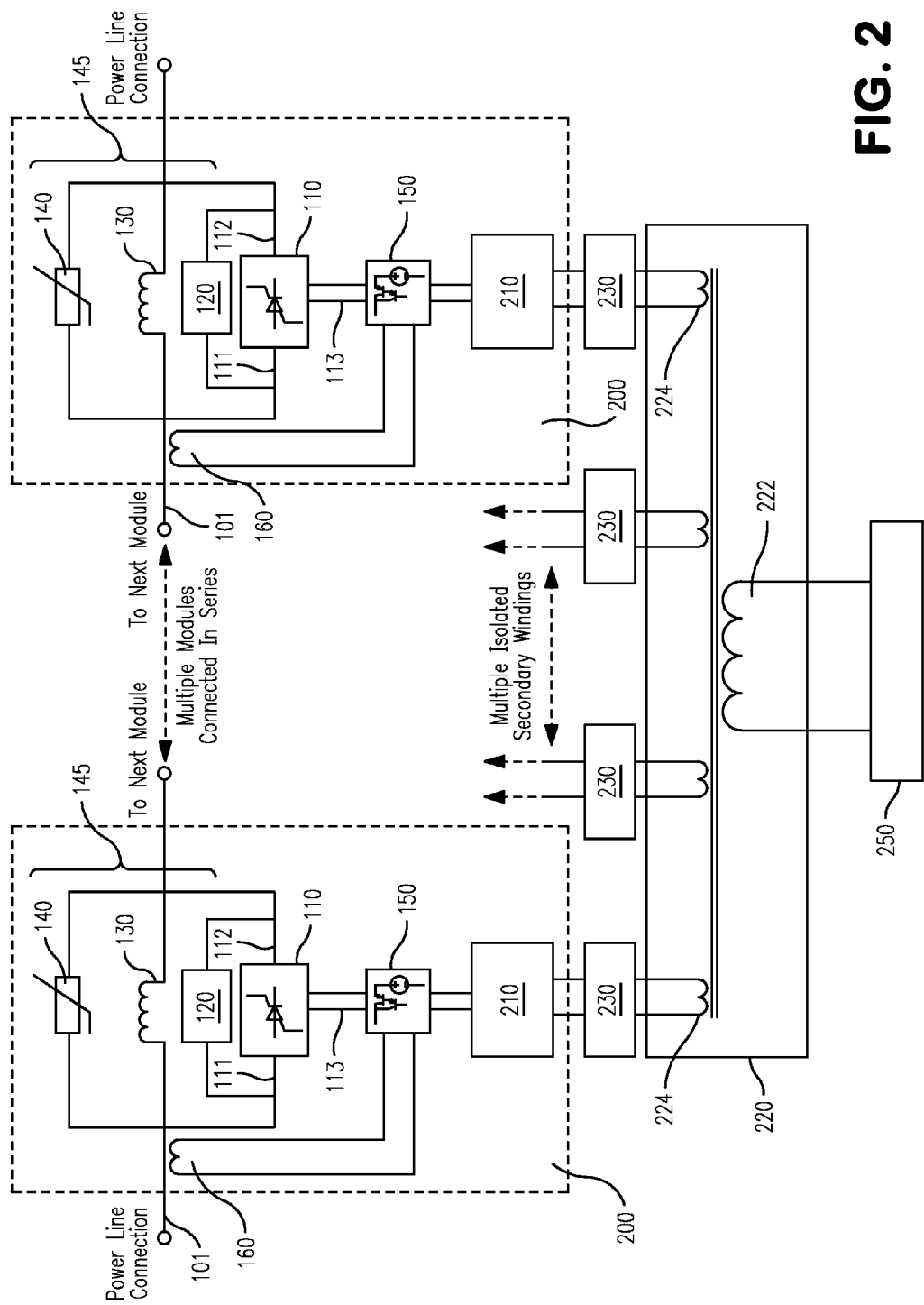
FIG. 2 shows a SSFCL device according to a first embodiment.

FIG. 2 shows a plurality of SSFCL devices 200 in accordance with a first embodiment. In this embodiment, each of the SSFCL devices 200 has many of the same components as that shown in FIG. 1, such as a solid state switching device 110, including a source 111, a drain 112 and a gate 113. Parallel components 145, such as a snubber 120, a reactor 130, and a transient suppressor 140, may be disposed in parallel with the solid state switching device 110. In addition, a gate driving circuit 150 may be in communication with the gate 113. A current sensor 160 is in communication with the power line 101 to detect the flow of current through the power line 101. These components perform the same function as described with respect to FIG. 1 and will not be described again.

In this embodiment, the isolated power supply 170 of the prior art (see FIG. 1) has been replaced with a lower cost non-isolated AC-to-DC power supply 210, which does not need to include isolation protection. Rather, the isolation protection is provided by an isolation transformer 220. This isolation transformer 220 has a primary winding 222 and one or more secondary windings 224. The primary winding 222 may be connected to AC power line 101, such as across two phases of the AC power line 101, or to an independent AC voltage source 250. The secondary winding is connected to the lower cost non-isolated AC-to-DC power supply 210. Optionally, an overvoltage protection circuit 230 may be disposed between each secondary winding 224 and the respective non-isolated AC-to-DC power supply 210. The isolation transformer 220 provides the necessary isolation.

Figure 3A:
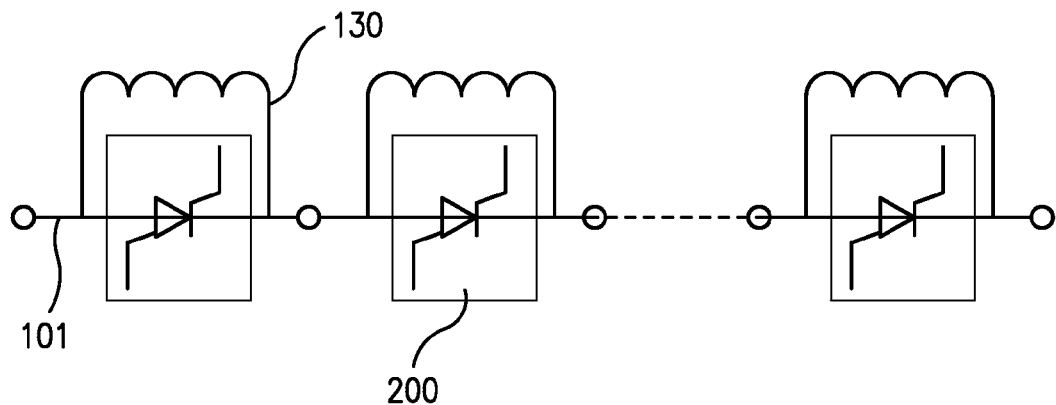
FIGS. 3A-3B show example configurations using multiple SSFCL devices arranged in series.
Figure 3B:
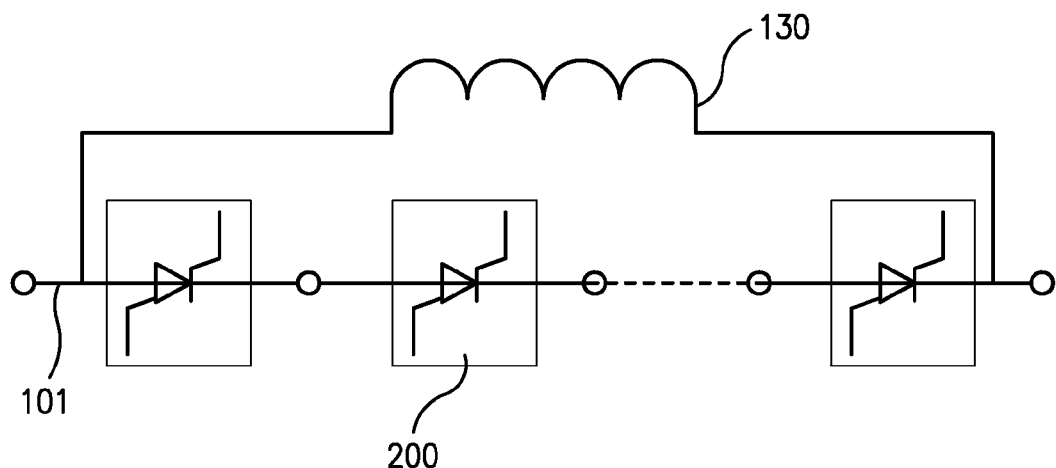

These SSFCL devices 200 may be arranged in at least two different configurations. For example, FIG. 3A shows a reactor 130 in parallel with each SSFCL device 200 (as depicted in FIG. 2). However, FIG. 3B shows a single reactor 130 in parallel with the series connection of SSFCL devices 200 in FIG. 3B. It is noted that when configured according to FIG. 3A, a respective set of these parallel components 145 is connected in parallel with each solid state switching device 110. In contrast, when configured as shown in FIG. 3B, a single reactor 130 is connected in parallel with the entire set of series connected solid state switching devices 110. Thus, the reactor 130, shown in FIG. 2, is not present in this embodiment. In addition, though not shown in FIG. 3A-3B, the snubber 120 and transient suppressor 140 are preferably in parallel with each solid state switching device 110.

As described above, the isolation transformer 220 provides isolation between these SSFCL devices 200. For example, when installed in accordance with the embodiment of FIG. 3A, the secondary windings 224 must meet certain criteria. First, the isolation voltage between any two secondary windings 224 may be greater than the power line voltage divided by the number of SSFCL devices 100. The isolation voltage between the secondary winding 224 to the primary winding 222 may be greater than the power line voltage. Any secondary winding 224 to ground isolation voltage may be greater than the power line voltage. In the case where the primary winding is energized from the power line 101, the primary winding 222 to ground isolation voltage may be greater than the power line voltage.

Furthermore, the primary and secondary windings, and adjacent secondary windings are all physically separated to provide, by design, proper high voltage isolation rating, equal to at least the line voltage of the system. In some embodiments, a design margin of, for example, 25%, may be incorporated as well. Of course, the distances between the winding assemblies depend on the voltage and isolation material used. For example, the use of epoxy and transformer oil can allow them to be relatively small. In the isolation transformer 220, it is much easier to accomplish the task of providing the power over isolation barrier than in the case of an isolated power supply 170, as there is no additional electronics in the isolation point. A non-isolated AC-to-DC power supply 210 is connected to each respective secondary winding, and its input and output are referenced to the same electrical common connection, which serves to make the system more reliable as far as the power supply is concerned.

When the SSFCL device 200 is installed in accordance with the embodiment of FIG. 3B, the isolation voltage between any two secondary windings 224 may be greater than the power line voltage. Criteria for other isolation voltages may be as described above.

It should be noted that FIG. 2 shows all of the gate driving circuits 150 for the respective SSFCL devices 200 powered from secondary windings 224 in communication with a single isolation transformer 220. However, other configurations are possible. For example, two or more isolation transformers 220 may be used, where secondary windings from these isolation transformers 220 provide power to all of the SSFCL devices 200.

As described above, the primary winding of the isolation transformer 220 may be connected to an independent AC source 250. This independent source 250 may be any single output AC source line with its own breaker. If desired, filters can be added to the AC source line to eliminate switching noise injected into the line. In one embodiment, the primary winding is connected to a standard AC line, having 120-240V AC, although other voltages are possible. In this embodiment, the isolation transformer 220 may be a primary winding to secondary winding ratio (referred to as the turns ratio) of 0.5 to 2, so that the secondary AC voltage is in the range of 120 to 240 volts. This secondary AC voltage is the input voltage required by the non-isolated AC-to-DC power supply 210. Therefore, if a different input voltage is preferred, the turns ratio is modified to achieve that input voltage in accordance with the relationship: the input voltage to non-isolated AC-to-DC power supply is equal to AC source voltage divided by the turns ratio.

In another embodiment, the primary winding of the isolation transformer 220 may be connected to the power line 101. In some embodiments, the isolation transformer 220 may be inserted in the power line 101 after the last reactor 130 (i.e. between the last SSFCL device 200 and the load). Of course, the isolation transformer 220 may be connected in other locations but the overprotection circuit 230 may be more complex. In this embodiment, the primary winding 222 may be disposed between two phases of the AC power line 101. In this embodiment, the isolation transformer 220 may have a suitable turns ratio, so that the secondary AC voltage is in the range of 120 to 240 volts. The overprotection circuits 230 may be used to limit the voltage in cases where the current through the power line 101 is higher than expected. In addition, the secondary AC voltage may dip during faults. To compensate for this, the non-isolated AC-to-DC power supply 210 may be designed to have a suitable input voltage range to accommodate this. For example, the input voltage range may be rated to a voltage less than 120V.

Each non-isolated AC-to-DC power supply 210 is referenced to the voltage of the power line 101 that is in communication with the solid state switching device 110. For example, the solid state switching device 110 is in communication with the power line 101 at its source side 111 and passes that voltage (when enabled) to its drain side 112. In one embodiment, the voltage at its source side 111 may be used as the common reference for the non-isolated AC-to-DC power supply 210. In another embodiment, the voltage at its drain side 112 may be used as the common reference for the non-isolated AC-to-DC power supply 210.

In this way, the output of the gate driving circuit 150, which is in communication with gate 113, for each SSFCL device 200 is referenced to a voltage at one of the terminals 111, 112 of the solid state switching device 150.

As described above, the lower cost non-isolated AC-to-DC power supply is greatly simplified by the inclusion of isolation transformer 220. Thus, rather than including the complex circuitry typically found in the isolated power supplies 170 of the prior art, the lower cost non-isolated AC-to-DC power supply 210 has fewer components. For example, a 45 kV DC isolated DC/DC, very low power (such as 5 W) power supply may cost more than $2000 and may require manufacturing lead times of 4-8 weeks. Furthermore, few vendors are capable of making such a power supply. In contrast, a non-isolated power supply having the same power requirements may cost less than $100, are readily available, and are much more reliable.

As described above, the SSFCL device 200 of FIG. 2 may be used with the configuration shown in FIG. 3A, where a set of parallel components 145 is associated with each solid state switching device 110. In addition, the SSFCL device 200 of FIG. 2 may be used with the configuration shown in FIG. 3B, where one reactor 130 is in parallel with all of the solid state switching devices 110, with snubbers 120 and transient suppressors 140 is parallel with each switching device 110.

Figure 4:
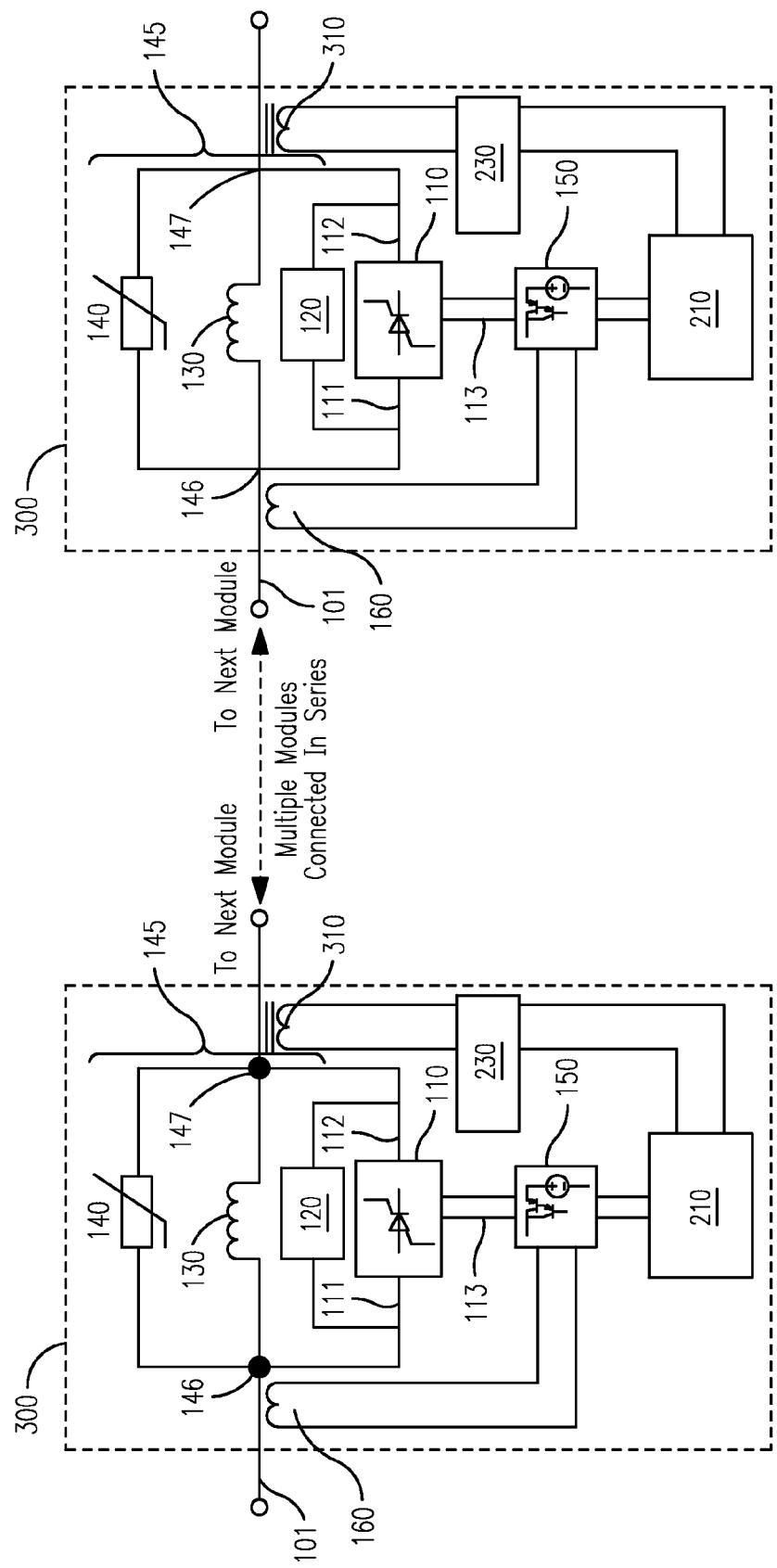
FIG. 4 shows a SSFCL device according to a second embodiment.

FIG. 4 shows a second embodiment of the SSFCL device 300 that can be used to create a less expensive, more reliable power system. In this embodiment, the SSFCL device 300 comprises the parallel components 145, solid state switching device 110, current monitor 160, gate switching circuit 150, low cost non-isolated AC-to-DC power supply 210 and overvoltage protection circuit 230 described above with respect to FIG. 2. These components perform the same function in this embodiment and will not be described again here. This second embodiment of the SSFCL device 300 can also be used in both embodiments shown in FIG. 3A and FIG. 3B, configured in the manner described above.

However, in this embodiment, each SSFCL device 300 comprises a respective isolation transformer 310. Each of these isolation transformers 310 has their primary windings connected to the power line 101. In one embodiment, the primary winding is disposed between two phases of the AC power line 101. In this way, the line voltage ($V_{line}$) is across the primary winding. The primary winding of the isolation transformer 310 may be disposed either proximate the source 111 or the drain 112 of the solid state switching device 110. In other words, the primary winding of the isolation transformer 310 may be disposed on either side of the solid state switching device 110. Consequently, it is necessary for there to be current flow through the power line 101 even when the switching device 110 is in the disabled state.

The secondary windings of the isolation transformers 310 are in communication with the low cost non-isolated AC-to- DC power supply 210. As described above, an overvoltage protection circuit 230 may be disposed between the secondary windings of the isolation transformer 310 and the non-isolated AC-to-DC power supply 210.

Each isolation transformer 310 may have a suitable turns ratio, such that the voltage created at the secondary windings 314 is between, for example, 120 and 240 volts, regardless of the state of the switching device 110. For example, if the line voltage ($V_{line}$) is 10 kV and the desired input voltage for the non-isolated AC-to-DC power supply 210 is 120V, the turns ratio may be determined as $V_{line}/120V$, or 83. Of course different line voltages and input voltages may also be used and the turns ratio is calculated accordingly.

In this way, the expensive and largely unreliable isolated power supply 170 may be replaced by an isolation transformer 220, 310 and a non-isolated AC-to-DC power supply 210. This change reduces the cost of the system and increases its reliability. The system may include an isolation transformer 220 having multiple secondary windings, as is shown in FIG. 2. In another embodiment, a dedicated isolation transformer 310 may be used with each SSFCL device 300, as is shown in FIG. 4.

Furthermore, a method of limiting fault current in an AC power line is disclosed. First, the current in the AC power line is monitored, such as by current monitor 160. Then, a voltage is applied to the gate 113 of the solid state switching device 110 to allow or inhibit the flow of current through the solid state switching device. The voltage used to control the gate 113 is generated by the gate driving circuit 150. Power is supplied to the gate driving circuit 150 by a non-isolated AC-to-DC power supply 210. The non-isolated AC-to-DC power supply is powered by an isolated AC voltage. This isolated AC voltage is created using an isolation transformer 220, 310. As described above, the primary winding of the isolation transformer 310 may be disposed across two phases of the AC power line. In another embodiment, the primary winding of the isolation transformer 220 is disposed across an independent AC source 250.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A solid state fault current limiting device for use with an AC power line, comprising:
    a solid state switching device, disposed in series in said AC power line, said solid state switching device having an input, an output and a gate, where a voltage applied to said gate determines whether current flows between said input and said output;
    a gate driving circuit in communication with said gate, to apply a gate voltage to said gate, said voltage referenced to either a voltage at said input or at said output;
    a current monitor in communication with said AC power line and said gate driving circuit, wherein said gate voltage is determined based on an output from said current monitor;
    an isolation transformer, having a primary winding and a secondary winding; and
    a non-isolated AC-to-DC power supply, powered by said secondary winding and referenced to said voltage at said input or at said output, to supply DC power to said gate driving circuit.

2. The solid state fault current limiting device of claim 1, wherein said primary winding is disposed between two phases of said AC power line.

3. The solid state fault current limiting device of claim 1, further comprising an independent AC source, where said primary winding is disposed across said independent AC source.

4. The solid state fault current limiting device of claim 1, further comprising an overvoltage protection circuit disposed between said secondary winding and said non-isolated power supply.

5. The solid state fault current limiting device of claim 1, wherein said primary winding and said secondary winding are physically separated so as to provide a voltage isolation rating equal to at least a voltage of said AC power line.

6. A method of limiting fault current in an AC power line, comprising:
    monitoring current through said AC power line; and
    applying a voltage to a gate of a solid state switching device to allow or inhibit the flow of current through said solid state switching device, wherein said voltage is generated by:
        using an isolation transformer to create an isolated AC voltage;
        using a non-isolated AC-to-DC power supply referenced to said AC power line to convert said isolated AC voltage to an isolated DC voltage; and
        using said isolated DC voltage to power a gate driving circuit in communication with said gate of said solid state switching device.

7. A system for limiting fault current in an AC power line comprising:
    an isolation transformer, having a primary winding and a first secondary winding and a second secondary winding;
    an independent AC source, wherein said primary winding is disposed across said independent AC source;
    a first solid state fault current limiting device, comprising:
        a first solid state switching device, disposed in series in said AC power line, said first solid state switching device having a first input, a first output and a first gate, where a first gate voltage applied to said first gate determines whether current flows between said first input and said first output;
        a first gate driving circuit in communication with said first gate, to apply said first gate voltage to said first gate, said first gate voltage referenced to either a voltage at said first input or at said first output;
        a first current monitor in communication with said AC power line and said first gate driving circuit, wherein said first gate voltage is determined based on an output from said first current monitor; and
        a first non-isolated AC-to-DC power supply, powered by said first secondary winding and referenced to said voltage at said first input or at said first output, to supply DC power to said first gate driving circuit; and a second solid state fault current limiting device, comprising:
- a second solid state switching device, disposed in series in said AC power line, said second solid state switching device having a second input in communication with said first output, a second output and a second gate, where a second gate voltage applied to said second gate determines whether current flows between said second input and said second output;
- a second gate driving circuit in communication with said second gate, to apply said second gate voltage to said second gate, said second gate voltage referenced to either a voltage at said second input or at said second output;
- a second current monitor in communication with said AC power line and said second gate driving circuit, wherein said second gate voltage is determined based on an output from said second current monitor; and
- a second non-isolated AC-to-DC power supply, powered by said second secondary winding and referenced to said voltage at said second input or at said second output, to supply DC power to said second gate driving circuit.

8. The system of claim 7, further comprising a first overvoltage protection circuit disposed between said first secondary winding and said first non-isolated power supply and a second overvoltage protection circuit disposed between said second secondary winding and said second non-isolated power supply.

9. The system of claim 7, wherein said primary winding and said first secondary winding are physically separated so as to provide a voltage isolation rating equal to at least a voltage of said AC power line.

10. The system of claim 7, wherein said first secondary winding and said second secondary winding are physically separated so as to provide a voltage isolation rating equal to at least a voltage of said AC power line.

* * * * *